United States Patent
Ho et al.

(10) Patent No.: US 11,522,589 B2
(45) Date of Patent: Dec. 6, 2022

(54) BEAMFORMER FOR DIGITAL ARRAY

(71) Applicant: Raytheon Company, Waltham, MA (US)

(72) Inventors: Kenneth Ho, Los Angeles, CA (US); Jenet Peng, Gardena, CA (US); Bennett Naden, Los Angeles, CA (US); Alyse C. Bowers, Torrance, CA (US)

(73) Assignee: Raytheon Company, Waltham, MA (US)

( * ) Notice: Subject to any disclaimer, the term of this patent is extended or adjusted under 35 U.S.C. 154(b) by 295 days.

(21) Appl. No.: 16/874,799

(22) Filed: May 15, 2020

(65) Prior Publication Data
US 2021/0359737 A1    Nov. 18, 2021

(51) Int. Cl.
| H04B 7/06 | (2006.01) |
|---|---|
| H01Q 1/24 | (2006.01) |
| H01Q 3/26 | (2006.01) |
| H01Q 21/22 | (2006.01) |
| H01Q 21/00 | (2006.01) |

(52) U.S. Cl.
CPC ......... H04B 7/0617 (2013.01); H01Q 1/246 (2013.01); H01Q 3/26 (2013.01); H01Q 21/0006 (2013.01); H01Q 21/22 (2013.01)

(58) Field of Classification Search
CPC .... H01Q 21/0006; H01Q 21/22; H01Q 1/246; H01Q 3/26; H01Q 3/2629; H01Q 3/2635; H04B 7/0617
See application file for complete search history.

(56) References Cited

U.S. PATENT DOCUMENTS

| 7,388,540 | B1* | 6/2008 | Zogg | H04B 17/27 |
|---|---|---|---|---|
| | | | | 342/370 |
| 8,947,294 | B1 | 2/2015 | Wasiewicz et al. | |
| 11,217,897 | B1* | 1/2022 | West | H01Q 3/385 |
| 2006/0038634 | A1* | 2/2006 | Kirino | H01Q 21/0006 |
| | | | | 333/164 |
| 2016/0135180 | A1* | 5/2016 | Yuan | H04B 17/12 |
| | | | | 370/329 |

(Continued)

FOREIGN PATENT DOCUMENTS

| CN | 1661857 A | * | 8/2005 |
|---|---|---|---|
| CN | 1707964 A | * | 12/2005 |

(Continued)

OTHER PUBLICATIONS

J.O. Coleman et al, Proceedings of the 2005 Antenna Applications Symposium, 35 pages (Year: 2005).*

(Continued)

*Primary Examiner* — Bernarr E Gregory
*Assistant Examiner* — Fred H Mull
(74) *Attorney, Agent, or Firm* — Daly Crowley Mofford & Durkee, LLP

(57) ABSTRACT

Methods and apparatus for providing a generic beamforming system. A first beamforming level can process digitized array data to form subarrays and output subarray data for the formed subarrays. A second beamforming level can process the subarray data to form beams and output beamforming data for a plurality of modules. A third beamforming level can process the beamforming data to process the beamforming data and generate formed beams for the array.

20 Claims, 14 Drawing Sheets

(56) References Cited

U.S. PATENT DOCUMENTS

2018/0366102 A1    12/2018  Ralston et al.
2019/0081824 A1*   3/2019   Arvinte ............... H04L 25/0204
2019/0387149 A1*   12/2019  Breisacher ............ H04N 5/232

FOREIGN PATENT DOCUMENTS

EP    2045877         4/2009
GB    2538070 A  *   11/2016   ............. H01Q 1/246

OTHER PUBLICATIONS

International Search Report and Written Opinion dated May 3, 2021 for International Application No. PCT/US2021/013874; 12 Pages.

* cited by examiner

L2RxBeamformingConfig - Bit Definition

| Input 7 | | | ... | Input 2 | | | Input 1 | | | Input 0 | | |
|---|---|---|---|---|---|---|---|---|---|---|---|---|
| $b_{23}$ | $b_{22}$ | $b_{21}$ | | $b_8$ | $b_7$ | $b_6$ | $b_5$ | $b_4$ | $b_3$ | $b_2$ | $b_1$ | $b_0$ |

| Value | Description |
|---|---|
| 0 | No input/Bit Bucket Data |
| 1 | Send to Accumulator 0 |
| 2 | Send to Accumulator 1 |
| 3 | Send to Accumulator 2 (Growth) |
| 4 | Send to Accumulator 3 (Growth) |
| 5-7 | Reserved/Unused |

*FIG. 5A*

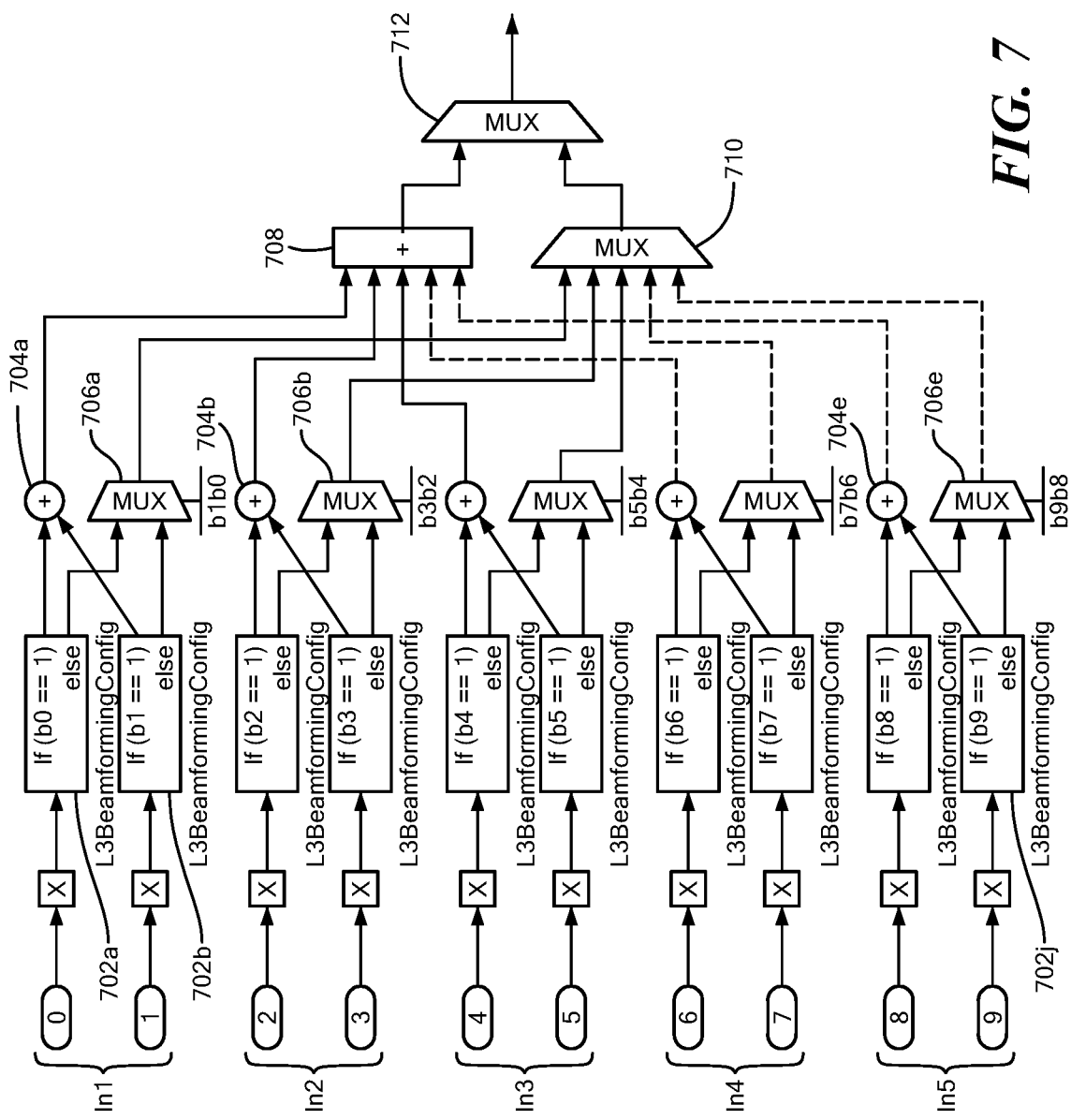

BEAMFORMER FOR DIGITAL ARRAY

BACKGROUND

As is known in the art, radio frequency (RF) sensor systems transmit RF signals and receive RF return signals from one or more targets. In conventional systems, the data received by RF antennas is typically analog combined before being digitized and processed over a few channels. In state of the art RF sensor systems, the data received by the RF antennas is digitized directly at the element via analog-to-digital converters (ADC) and processed by digital computer to enable greater spatial degrees of freedom in a more flexible manner compared to analog predecessors. State of the art RF sensor systems use digital arrays to provide antenna element level digitization while covering multiple frequency bands and/or dual polarization to support multi-function operation such as radar, electronic warfare, and communication functionalities. These digital arrays provide significantly more spatial degrees of freedom compared to analog predecessors and can be formed into an array of any desired size and shape. Additionally, with the advances in ASIC and FPGA technology, these digital arrays can be created with a combination of these components to process large volumes of data while reducing size, weight, and power (SWAP) to support more applications relative to its predecessor.

A digital array allows various aperture configurations to support the multiple functions a platform uses. One use case of a digital array is the creation of arbitrary and irregular sized subarrays to mitigate sidelobes. Different RF sensor functions may need to combine elements together in different configurations. To provide this type of flexibility in an ASIC or FPGA is challenging due to the numerous on-board routes required that may lead to a design that cannot close timing and be fabricated.

SUMMARY

Embodiments of the invention provide methods and apparatus for a digital array that can process data and form beams for hundreds or thousands of elements with a layered/systolic approach by breaking down processing into configurable, digestible levels. In embodiments, each beamforming level handles data in groups of data streams, e.g., eight or sixteen streams, for providing a reasonable size when managing routing congestion on a processing module, such as an FPGA. Each level passes these data streams to the next level for additional combining to provide a tiered processing approach that can manage bandwidth from one level to the next.

For enabling flexibility to form various size beams and subarrays in a variety of configurations, a configurable bit-mask, for example, controlled by software may be used at each beamforming level. In embodiments, the bit-mask defines which data streams to combine and which data streams to pass-through to the next level. In embodiments, bit-masks can be provided by software after the application or function has selected subarray and beam configurations. The combination of a tiered approach with a generic configurable bit-mask describes how beams can be formed to allow for any practical number of beam/subarray configurations when looking across the entire digital array.

Example embodiments having a tiered/layered beamforming scheme can emulate systolic beamformers for managing routing congestion challenges and simplifying FPGA or other implementations. In addition, the use of a configurable bit-mask at each processing layer provides a generic approach to beamforming, as well as the capability to form various sized and various configurations of beams/subarrays. Each processing node (also referred to herein as processing unit) has the same capability and runs in parallel with other processing nodes at the same beamforming level and can be configured differently at run-time to provide a wide range of possible configurations. In embodiments, new configurations can be supported by existing firmware while software is updated which may greatly reduce the costs for implementing new configurations.

In one aspect, a method comprises: receiving digitized array data from an array of antenna elements of an RF sensor system; in a first beamforming level, processing the array data to form subarrays and output subarray data for the formed subarrays; in a second beamforming level, processing the subarray data to form beams at a module level and output beamforming data for a plurality of modules; and in a third beamforming level, processing the beamforming data to generate formed beams for the array.

A method can further include one or more of the following features: processing performed in the second layer is independent of the first layer, processing by the first, second, and/or third processing layers is modified by software, processing by the first, second, and/or third processing layers is modified by software and firmware is not modified, bit-masks are controlled by the software to change the processing, limiting each processing node in the first, second, and third layers to a maximum number of elements, the first processing layers includes configurations for element-level processing, 2×2 element processing, 4×4 element processing, and column element processing, configurations for the first processing layer are selected by a software-controlled bit mask, the second processing layer includes demultiplexers controlled by software to generate a selected beamforming configuration, the third processing layer is configured to pass through some of the beamforming data from the second processing layer and to combine some of the beamforming data from the second processing layer, the third processing layer includes selector elements controlled by software to perform the combining and the passing through of the beamforming data from the second processing layer, and/or the beamforming data from the second layer comprises outputs having multiple polarizations.

In another aspect, a system comprises: a first beamforming level configured to process digitized array data from an array of antenna elements of a RF sensor system for forming subarrays and to output subarray data for the formed subarrays; a second beamforming level configured to process the subarray data to form beams at a module level and output beamforming data for a plurality of modules; and a third beamforming level configured to process the beamforming data to generate formed beams for the array.

A system can further include one or more of the following features: processing performed in the second layer is independent of the first layer, processing by the first, second, and/or third processing layers is modified by software, processing by the first, second, and/or third processing layers is modified by software and firmware is not modified, bit-masks are controlled by the software to change the processing, limiting each processing node in the first, second, and third layers to a maximum number of elements, the first processing layer includes configurations for element-level processing, 2×2 element processing, 4×4 element processing, and column element processing, configurations for the first processing layer are selected by a software-controlled bit mask, the second processing layer includes demultiplexers controlled by software to generate a selected beamforming configuration, the third processing layer is configured to pass through some of the beamforming data from the second processing layer and to combine some of the beamforming data from the second processing layer, the third processing layer includes selector elements controlled by software to perform the combining and the passing through of the beamforming data from the second processing layer, and/or the beamforming data from the second layer comprises outputs having multiple polarizations.

BRIEF DESCRIPTION OF THE DRAWINGS

The foregoing features of this invention, as well as the invention itself, may be more fully understood from the following description of the drawings in which:

FIG. 5A is representation of an example configuration bit mapping for the second layer of data processing of FIG. 5;

FIG. 7 is a digital schematic of an example implementation of a third layer of data processing;

DETAILED DESCRIPTION

Figure 1:
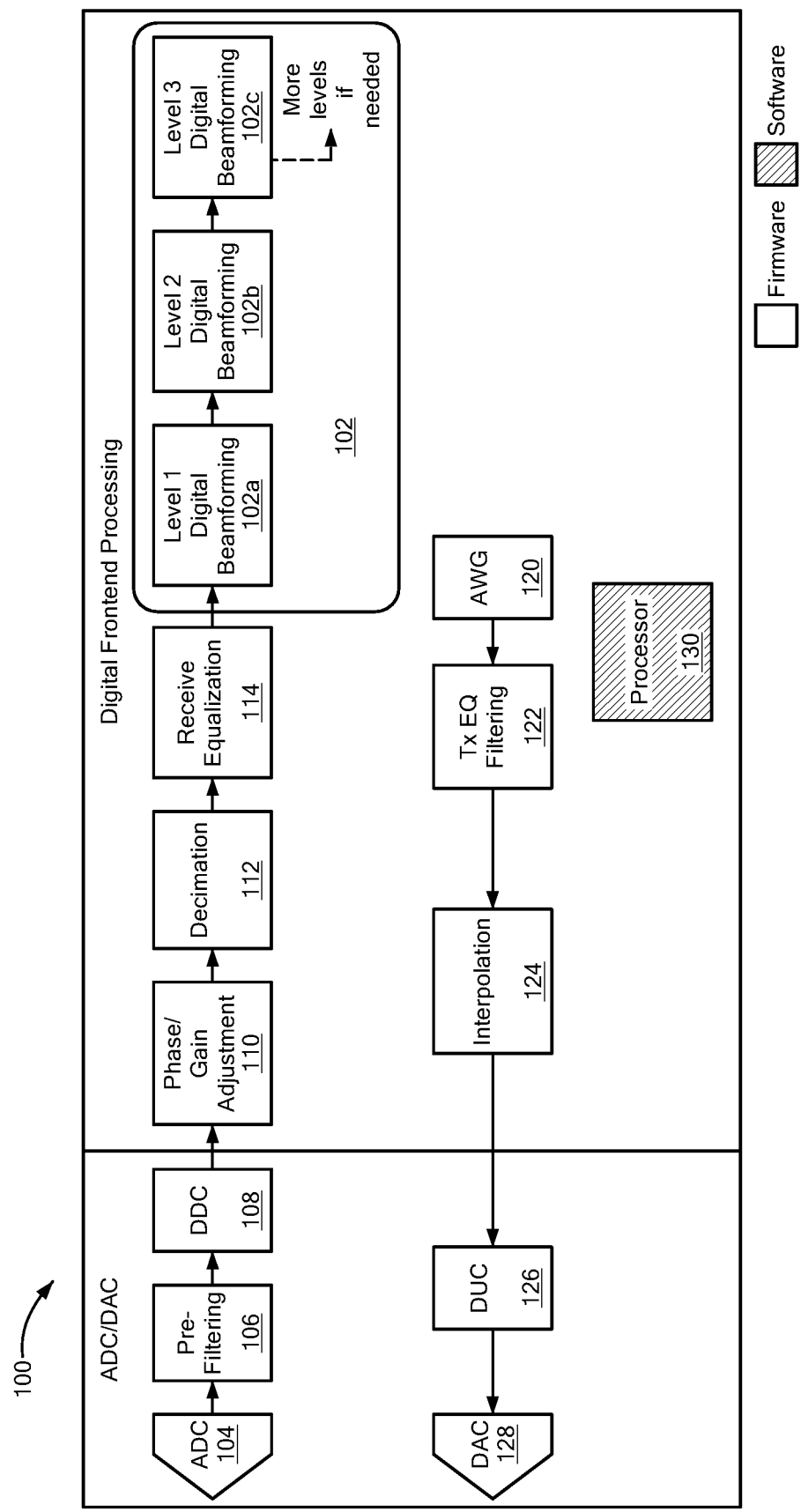
FIG. 1 is a functional block diagram of an example front end of a RF sensor system having layered beamforming in accordance with example embodiments of the invention.

FIG. 1 shows an example digital array 100 having a layered beamforming system 102 in accordance with example embodiments of the invention. In embodiments, the beamforming system 102 includes a series of processing layers 102a,b,c for processing the received signal, as described more fully below. An analog-to-digital converter (ADC) 104 receives and digitizes analog signals from antenna elements (not shown). The digitized signals are pre-filtered 106 and digitally downconverted 108 prior to phase and gain adjustment 110 of the received RF signals after which decimation 112 is performed in a conventional manner. Equalization 114 for the receive signals is then performed prior to processing by the beamforming system 102.

In embodiments, the first beamforming level 102a can be considered level 1 beamforming, which may form the highest fidelity digital subarrays, the second beamforming level 102b can be considered level 2 beamforming for digital subarrays within a module, and the third beamforming level 102c can be considered level 3 beamforming across multiple modules.

While three beamforming levels are shown in example embodiments, it is understood that any practical number of levels can be used to meet the needs of a particular application. Further, any practical number of elements, modules, subarrays, and the like can be used. In addition, it is understood that processing in multiple layers can be combined into one processing layer without departing from the scope of the invention as claimed. For example, processing in first and second layers can be combined into a combined layer.

Figure 1A:
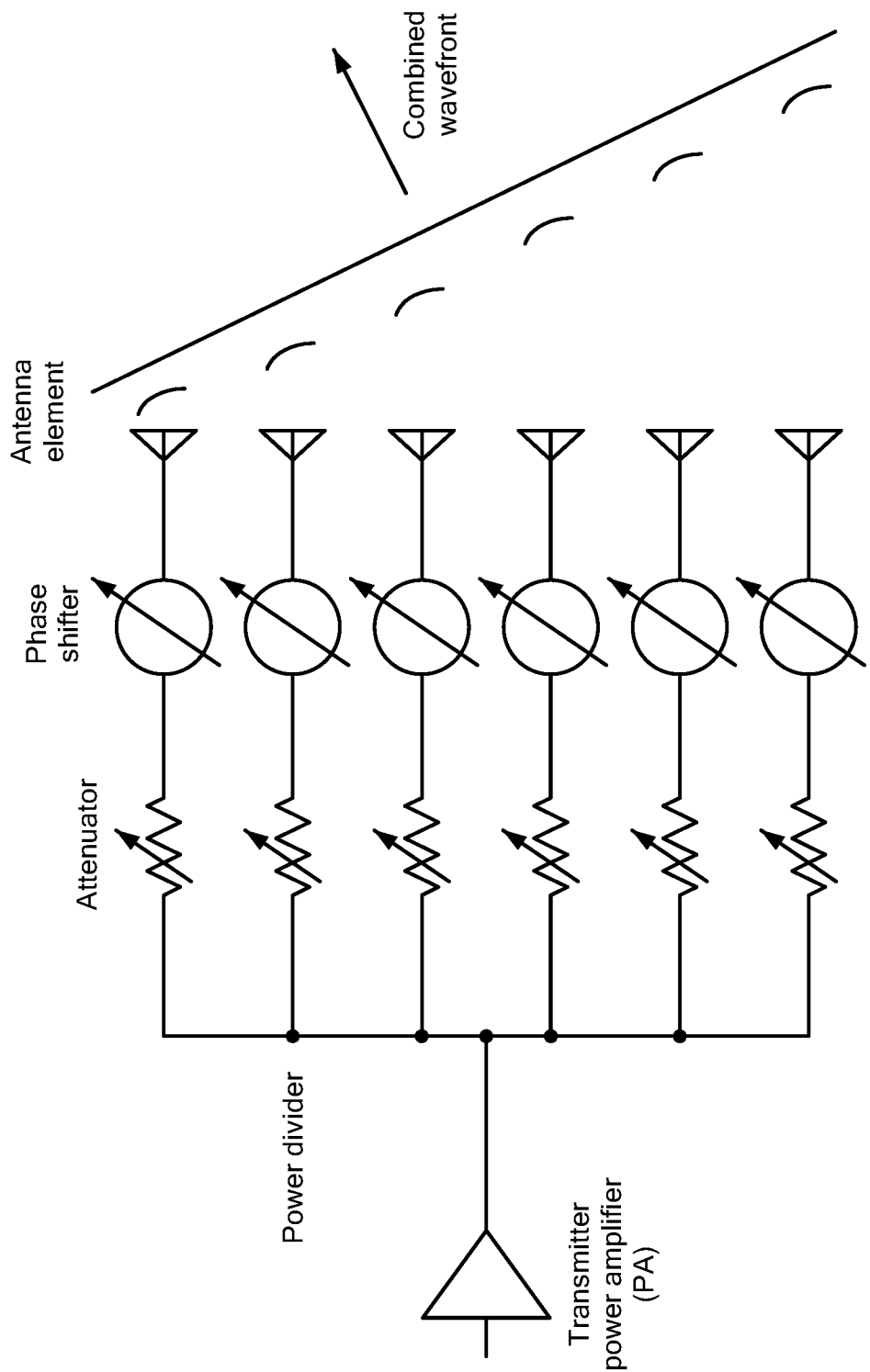
FIG. 1A is a schematic representation of an example antenna element signal transmission system that can form a part of the RF sensor system of FIG. 1.

The array 100 may also transmit signals. In the illustrated embodiment, an arbitrary waveform generator (AWG) 120 generates element-level signals at a manageable sample rate. The AWG signals go through a transmit equalization and filtering module 122 and then an interpolation module 124 which converts the signals to the DAC sample rate. The signal is then digitally upconverted 126 and converted to an analog signal by a digital-to-analog converter (DAC) 128. A processor 130 can control overall operation of the array, as well as compute beamforming coefficients, waveforms, configuration bit masks, and the like, in software. The analog signal is then transmitted into free space by the antenna elements in the array. FIG. 1A shows an example transmit system including antenna elements with an attenuator and phase shifter modules to generate a transmit signal having a desired wavefront.

In embodiments, the layered beamforming system 102 decomposes larger beamforming chunks into manageable sizes. Software-controllable bit-masks, for example, at each beamforming layer enable a variety of beamforming combinations. In illustrative embodiments, software determines the combination of elements to be processed during beamforming and coordinates across the layers to achieve the desired aperture level beamforming configuration. In example embodiments, each layer of beamforming is independent and agnostic to the configuration used in the previous beamforming layer to provide a generic approach. In embodiments, firmware does not need to be changed to support new beamforming configurations.

It is understood that layered beamforming embodiments are applicable to arrays having any practical number of antenna elements and channels. For example, an array having thousands of elements can be controlled by modules supporting a given number of elements, e.g., 8, 16, 64, etc., and corresponding channels, e.g., 16, 32, 128. In one example, a module can include four stages of beamforming to reduce 64 elements to as low as two outputs per module, one output per polarization. Beamforming across multiple modules may be implemented in a wide variety of architectures than can include one or more FPGAs, processors, and/or other components to enable aggregating multiple streams of inputs for handling the incoming bandwidth. Any practical number of processing stages can be used to meet the needs of a particular application. In addition, a layered beamforming approach is readily scalable with the use of identical processing nodes and parallel data stream processing. In embodiments, beamforming is limited at each processing node to a given number, e.g., sixteen, elements, for manageable routing within a processing node.

Figure 2:
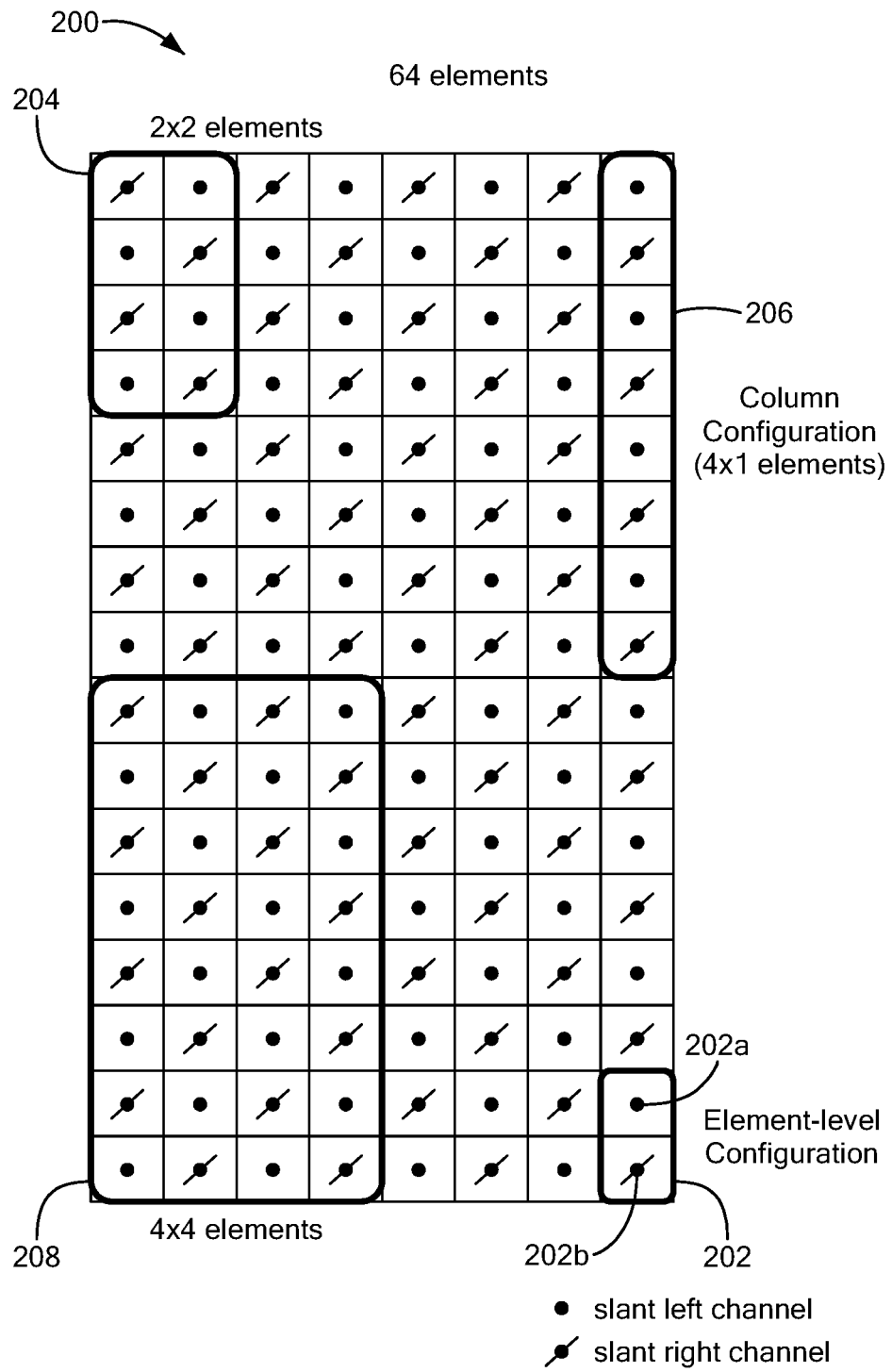
FIG. 2 is a pictoral representation of subarrays that can be formed by a first layer of processing.

FIG. 2 shows an example 8×8 subarray 200 of 64 elements at S-band spacing for a module that supports UHF to S-band where each element 202 comprises two orthogonal polarization channels, in this example a slant left channel 202a and a slant right channel 202b. A 2×2 element configuration 204, a 4×1 element configuration 206 and a 4×4 element configuration 208, are shown. It is understood that any practical element configuration can be used.

In general, an element level configuration 202 provides the highest degree of freedom where individual channels are output. An element level configuration 202 may be well-suited for relatively low bandwidth applications, such as calibration, where measurements for each channel may be needed. The 2×2 element configuration 204 combines four elements in a box into one for providing effective element-level sampling at L-band, for example, where element-level sampling is needed at slightly higher data bandwidths. The 4×1 element configuration 206 combines four elements within a column into one which can provide element-level sampling at S-band in the azimuth direction while trading elevation degrees of freedom, for example. The 4×4 element configuration combines sixteen elements within a box into one to allow for high receive data bandwidth or high receive duty to be output.

Figure 3:
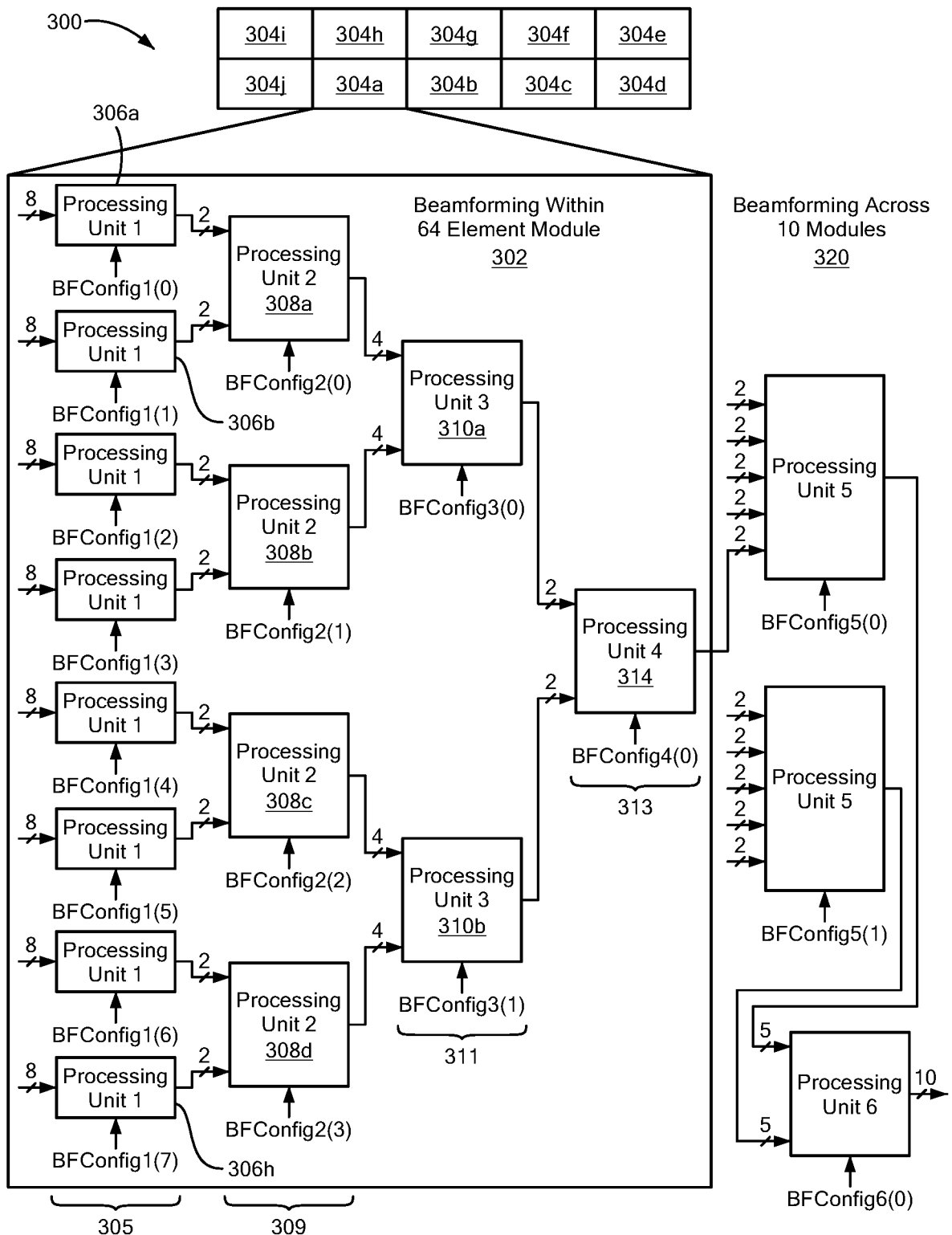
FIG. 3 is a schematic representation of an example implementation with three layers of data processing.

FIG. 3 shows an example layered beamforming system 300 including an illustrative 64-element module 302 that forms a part of system having ten modules 304a-j for a total of 640 elements. In the illustrated embodiment, a first processing layer 305 includes a series of eight processing units 306a-h each receiving 8 element inputs and generating 2 outputs to each of four processing units 308a-d in a second processing layer 309. A third processing layer 311 includes two processing units 310a,b that each receive 8 inputs (4 from each of two units in the second layer 309) and generate 2 outputs for a fourth processing layer 313 having one processing unit 314, which generates 2 outputs to a combining system 320 for combining the outputs for each of the ten 304a-j modules for aperture level beamforming outputs.

In an example embodiment, referring to FIG. 3, a first beamforming level (e.g., level 1 beamforming), which can correspond to the level 1 digital beamforming 102a in FIG. 1, includes the first and second processing layers 305, 309. A second beamforming level, which can correspond to the level 2 digital beamforming 102b of FIG. 1, includes the third and fourth processing layers 311, 313. A third beamforming level, which can correspond to the level 3 digital beamforming 102c of FIG. 1, includes combining system 320.

Figure 4:
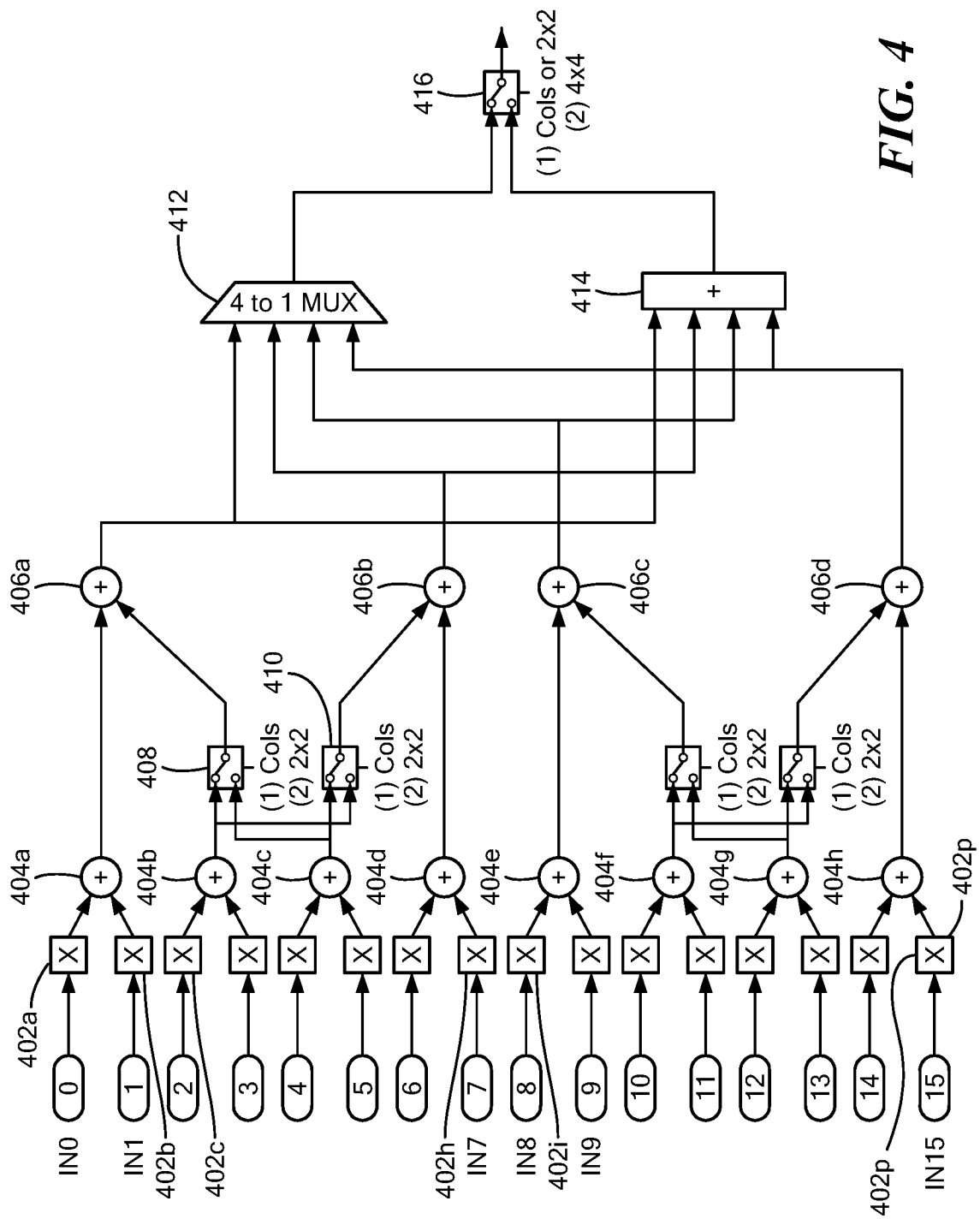
FIG. 4 is a digital schematic of an example implementation of a first layer of data processing.

FIG. 4 shows an example logical schematic implementation 400 of the first beamforming level (processing layers 305, 309 of FIG. 3), and more particularly, the 8 inputs to the first processing unit 306a and the 8 inputs to the second processing unit 306b of the first processing layer 305, and the 4 outputs from the first processing unit 308a of the second processing layer 309.

A first set of eight element inputs IN0-7 are provided to respective elements 402a-h and a second set of eight element inputs IN8-15 are provided to respective elements 402i-p. Each of the elements 402 are multiplied by beamforming weights "X" and then provided as inputs to a series of two-input adder elements 404a-h. Each of adder elements 404 provides inputs to two-input adders 406a-d. In the illustrated embodiments, a first switch 408 selects between the outputs of adder 404b and adder 404c as input to adder 406a. A second switch 410 also selects between the outputs of adder 404b and adder 404c as an input to adder 406b.

In the illustrated embodiment, outputs of the adders 406a,b,c,d are inputs to a multiplexer 412 and to an adder 414. The output of the multiplexer 412 and adder 414 are inputs to switch 416 that can select one of the inputs and provide either 1 or 4 output streams, for example.

In the illustrated embodiment, switches, e.g., switches 408 and 410, are controlled to select a column subarray or a 2×2 element configuration, for example, and switch 416 is controlled to select the column/2×2 input or a 4×4 element configuration, for example. Other element configurations can be selected for desired subarray formations.

It is understood that element level beamforming is not shown in the example embodiment as data would bypass level one beamforming processing. Since the RF return signal is digitized on a per channel basis at the ADC for each element, single channel beamforming requires no additional computation at level 1 and can be a direct input to level 2. In other words, in the example embodiment, as well as other examples, an element-level configuration simply entails data pass-through of the example embodiment steps and is therefore not shown. With respect to the example embodiment, an element-level configuration would have all 16 data streams IN0-15 skip the shown data path blocks and all be output to the receiver block of 416. It is understood that this element-level configuration is supported by the invention and is omitted from most example embodiments for convenience.

In embodiments, level 1 beamforming (beamforming level 102a, in FIG. 1, and processing layers 305, 309 in FIG. 3) can use a configuration bit mask, for example, which may be controlled in software. Example bit mask values are set forth below:

0: Element-level
1: Columns
2: 2×2s
3: 4×4s

It is understood that a variety of circuit implementations can be used to provide the desired configurations to meet the needs of a particular implementation. It is further understood that a range of hardware and software partitions can be used to achieve desired functionality. In some embodiments, multipliers can be used to support multiple simultaneous receive beams, for example.

Figure 5:
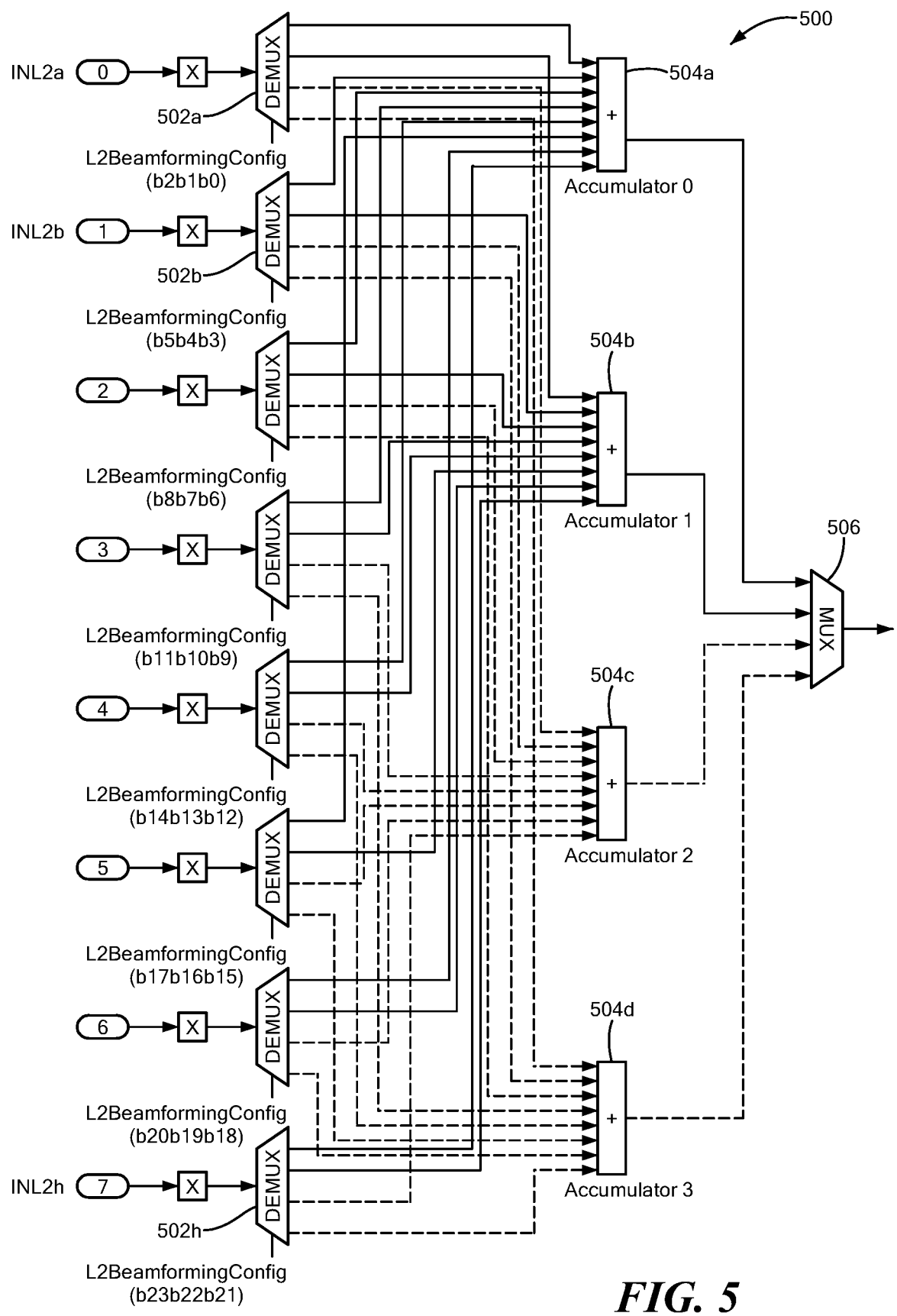
FIG. 5 is a digital schematic of an example implementation of a second layer of data processing.

FIG. 5 shows an example level 2 beamforming implementation which may correspond to the second level 102b of FIG. 1 and/or the third and fourth processing layers 311, 313 of FIG. 3. In embodiments, the level 2 beamforming implementation is independent of the configurations selected for level 1 beamforming. Irregular subarray sizes or subarrays used as guard/aux channels can be formed in level 2 beamforming, for example. In embodiments, some of the same configurations can be formed whether columns or 2×2s are used.

In the illustrated embodiment, level 2 beamforming receives eight inputs INL2a-h as the outputs from level 1 beamforming. Each of the inputs INL2a-h is provided to a respective demultiplexer 502a-h having four outputs, each of which is coupled as an input to a series of accumulators, which can comprise adders 504a-d. Each output of the accumulators 504a-d is coupled as an input to a multiplexer 506, which provides a level 2 beamforming output.

In embodiments, the demultiplexers 502 are controlled by configuration inputs for selecting the desired output based upon the particular level 2 beamforming configuration. In example embodiments, software controls the configuration and firmware performs the operations based on the selected configuration. That is, the firmware, which is controlled by software, does not need to be changed for different configurations. In this context, firmware is a type of software that is utilized to configure hardware and is hosted on an ASIC or FPGA hardware or other circuit components. The firmware can be controlled or configured by software to the extent that the ASIC or FPGA circuitry, for example, was programmed to support the configuration.

FIG. 5A shows an example level 2 configuration bit mapping for controlling the demultiplexers 502a-h of FIG. 5. Referring again to FIG. 5, in the illustrated example embodiment, multiplexer 502a is controlled by bits b2, b1, b0, multiplexer 502b is controlled by bits b5, b4, b3, and so on, with multiplexer 502h controlled by bits b23, b22, b21. Based on the bit values, the demultiplexers 502 send the input to the selected accumulator 504 to effect a given operation.

It is understood that FIG. 5A is one example configuration implementation. One of ordinary skill in the art can readily modify, substitute, and provide different implementations that are well within the scope of the present invention as claimed.

Level 2 beamforming can be used for a wide variety of beamforming/subarray combinations. Irregular subarrays and subarray sizes can used. In some embodiments, guard/auxiliary channels can be formed to meet the needs of a particular application. In embodiments, the same or similar configurations can be used for columns and 2×2 element configurations.

Figure 6A:
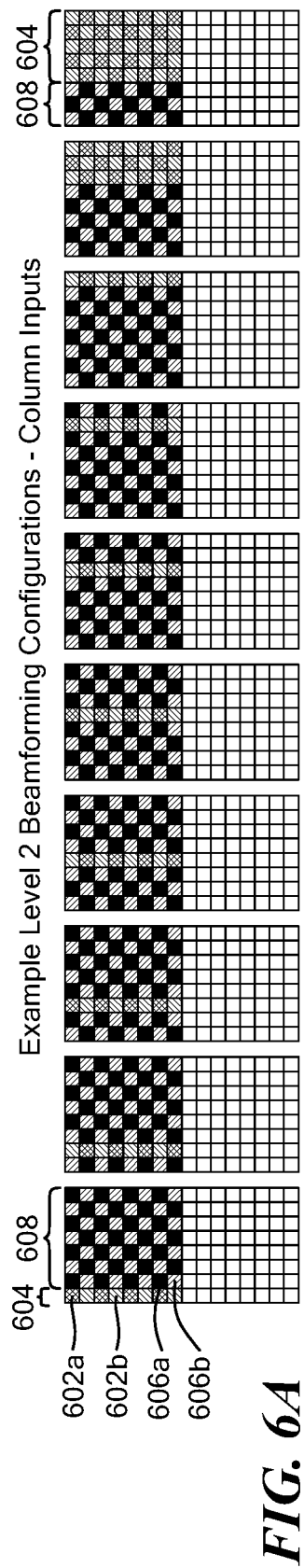
FIGS. 6A to 6C show example outputs for the second layer of data processing.
Figure 6B:
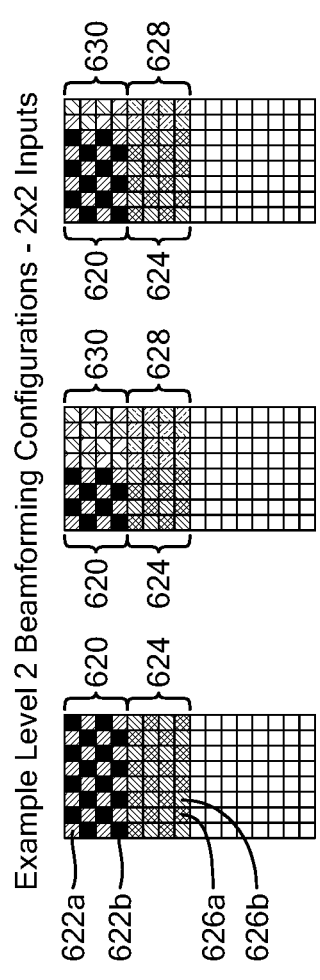
Figure 6C:
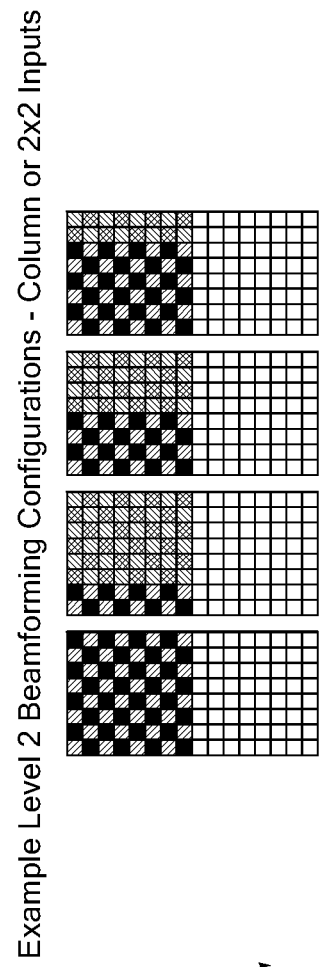

FIGS. 6A to 6C show example outputs for level 2 beamforming configurations for example level 1 inputs for given modules comprised of dual-polarization elements. In these examples, each polarization has the same beamforming operation performed on it but it does not necessarily need to be the same for each channel/polarization. FIG. 6A shows example column input configurations with a first polarization 602a and a second polarization 602b for a first output 604 of a level 2 beamforming module, as well as first and second polarizations 606a,b for a second output 608. In some embodiments, as can be seen, a single column with first and second polarizations for one of the outputs is shown and in other embodiments, multiple columns are shown.

FIG. 6B shows example 2×2 inputs from level 1 beamforming with first and second polarizations for first, second, third, and fourth subarray/beam outputs of a level 2 module. The left beamforming configuration includes 2×2 inputs for a first output 620 from a level 2 module having first and second polarizations 622a,b and a second output 624 having first and second polarizations 626a,b. The middle beamforming configuration includes 2×2 inputs with the first and second outputs 620, 624 and third and fourth outputs 628, 630 each with first and second polarizations. The right-most beamforming configuration also shows 2×2 inputs with first, second, third, and fourth outputs 620, 624, 628, 630 each with first and second polarizations. FIG. 6C shows level 2 beamforming configurations with column or 2×2 inputs.

It should be noted that the level 2 beamforming implementation is independent of the configuration chosen in level 1, but the subarrays formed in level 2 are dependent, i.e., can be no smaller than, the beams previously formed in level 1.

FIG. 7 shows an example level 3 beamforming implementation which may correspond to the third beamforming level 102c of FIG. 1 or the processing layer 320 of FIG. 3 including the ten inputs to the upper or lower processing unit. A first two-bit input In1 has a first bit sent to a selector 702a. Depending upon a configuration bit b0, for example, the selector 702a sends an output to an adder 704a or a multiplexer 706a. The second bit of input In1 is sent to selector 702b. Depending upon a configuration bit b1, for example, the selector 702b sends an output to the adder 704a for addition with the first bit of In1, or to the multiplexer 706a.

The output of adder 704a is an input to adder 708, which provides an input to multiplexer 712. The multiplexer 706a selects either the output from selector 702a or selector 702b to be an input to multiplexer 710, which provides an input to multiplexer 712. This configuration enables pass through and combinations for various beamforming configurations. In embodiments, the level 3 beamforming configuration is agnostic with respect to level 1 and level 2 configurations as long as the subarrays formed at level 3 are equal to or larger than the input subarrays from level 2.

Figure 7A:
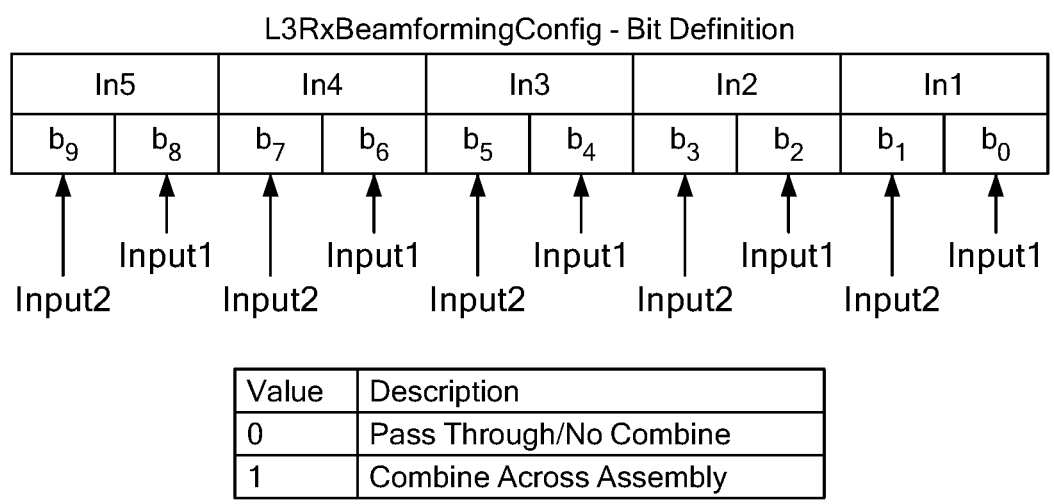
FIG. 7A is representation of an example configuration bit mapping for the third layer of data processing of FIG. 7.

FIG. 7A shows an example level 3 beamforming bit map for controlling the selectors 702 of FIG. 7. In the illustrated embodiment, bit b0 controls selector 702a, bit b1 controls selector 702b, and so on. The control bits can also control the multiplexers 704 as well. For example, bits b1, b0 can control multiplexer 706a, bits b3, b2 can control multiplexer 706b and so on. In example embodiments, a bit value of 0 indicates pass through/no combine and a bit value of 1 indicates combine across an assembly.

FIGS. 8A to 8D show example level 3 beamforming configurations with inputs from three modules for ease of explanation. It is understood that any practical number of modules can be used.

Figure 8A:
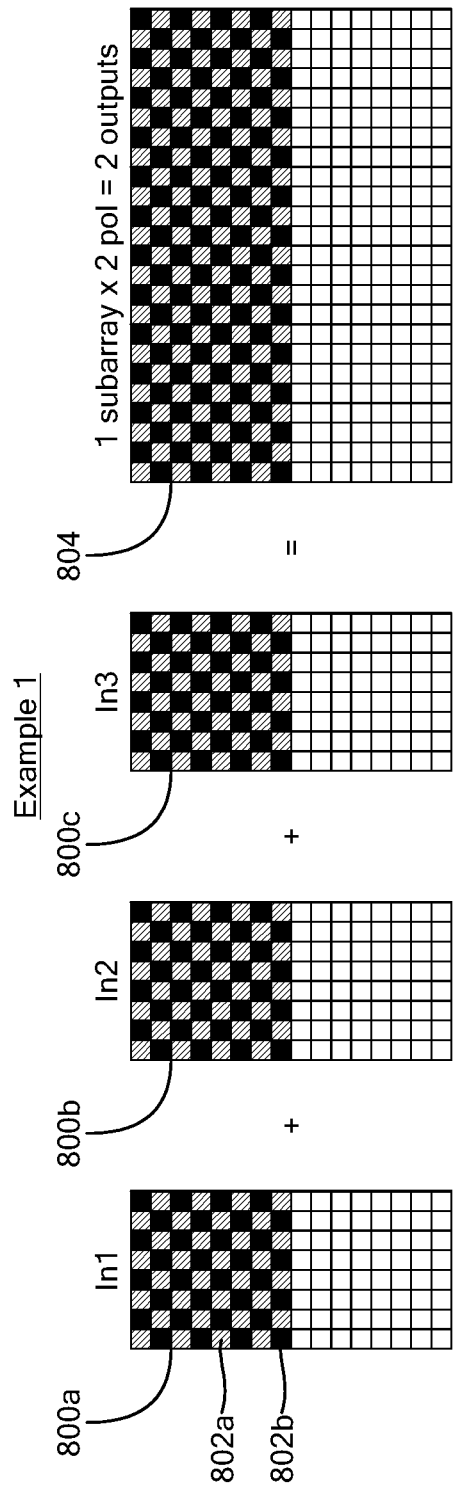
FIGS. 8A to 8D show example outputs for the third layer of data processing.

FIG. 8A shows first, second and third inputs 800a,b,c which correspond to beams/subarrays each having first and second polarizations 802a,b. The output comprises one subarray 804 with the first and second polarizations.

Figure 8B:
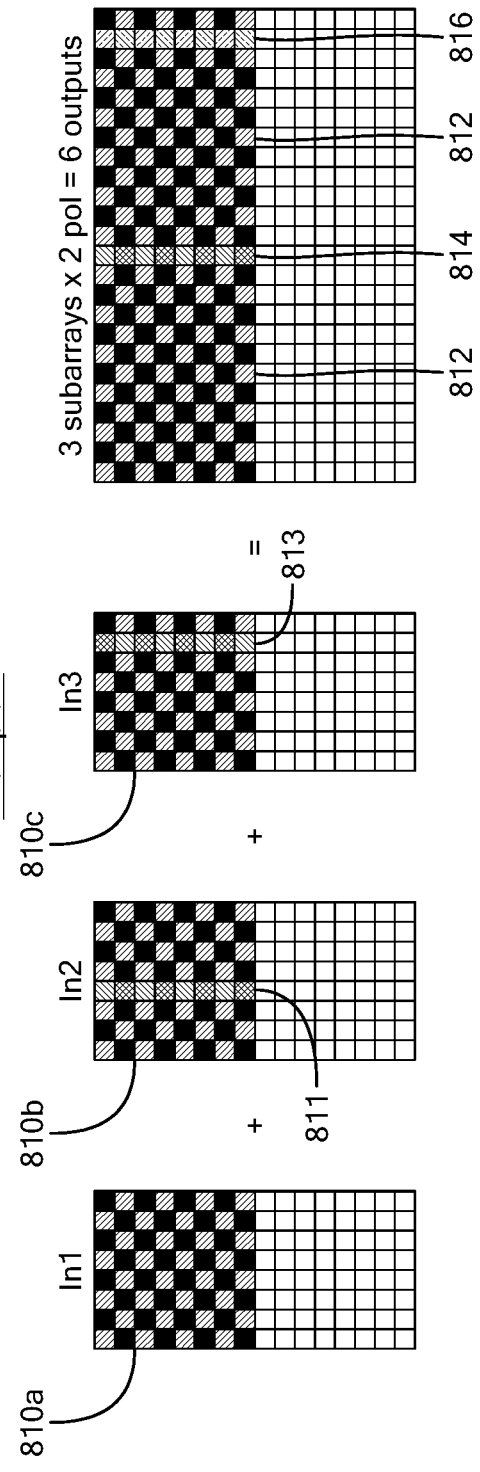

FIG. 8B shows a first input 810a, a second input 810b with a column 811, and a third input 810c with a column 813, where columns are directly passed through to the backend for processing. The output 812 comprises three subarrays 812, 814, 816 and two polarizations resulting in six output types.

Figure 8C:
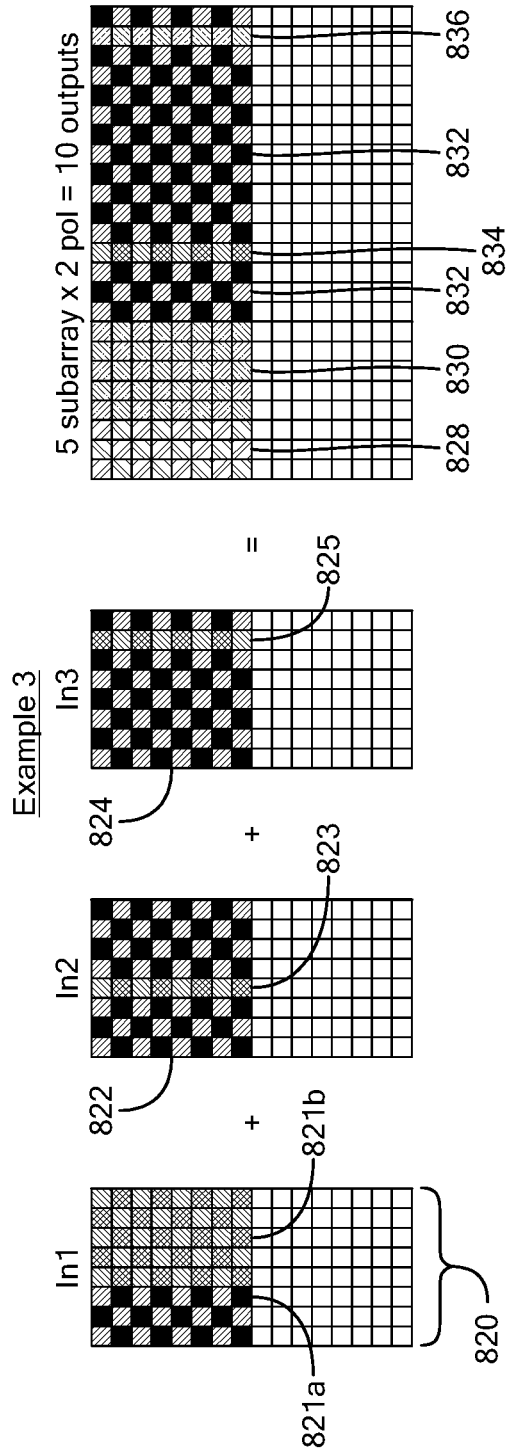

FIG. 8C shows a first input 820 with first and second subarrays 821a,b, a second input 822 with a column 823, and a third input 824 with a column 825. The two subarrays 821a,b and the columns 823, 825 are directly passed through while the subarrays 821a,b of the first type are combined to form five subarrays 828, 830, 832, 834, 836 and two polarizations resulting in ten output types.

Figure 8D:
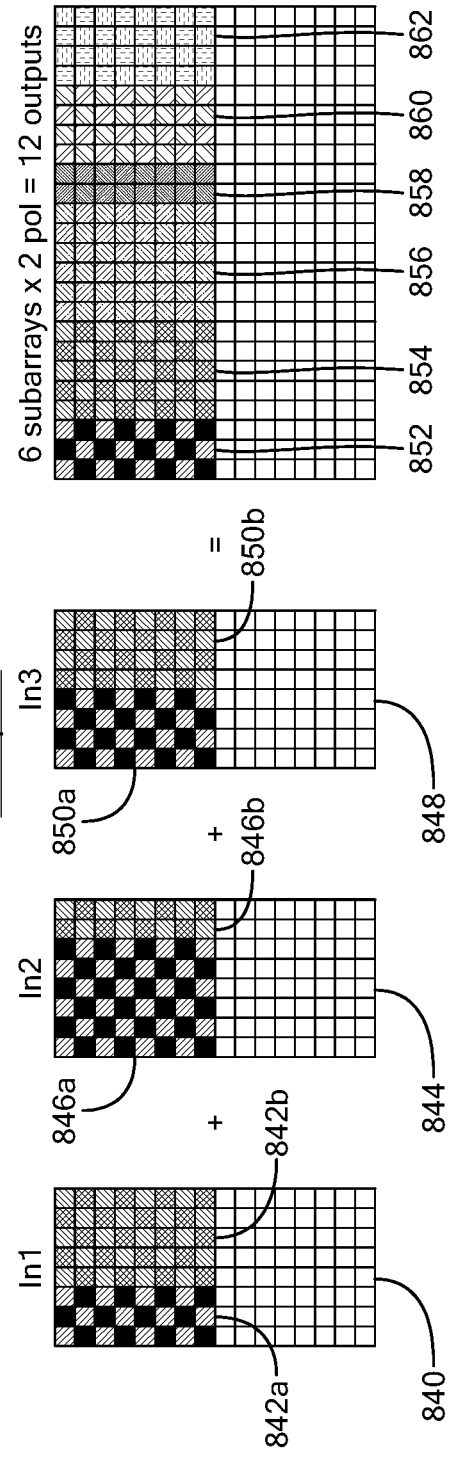

FIG. 8D shows a first input 840 with first and second subarrays 842a,b, a second input 844 with first and second subarrays 846a,b, and a third input 848 with first and second subarrays 850a,b. In the illustrated embodiment, all subarrays 842a,b, 846a,b, 850a,b are directly passed through to the backend for processing resulting in six subarrays 852, 854, 856, 858, 860, 862 with two polarizations for twelve output types.

Figure 9:
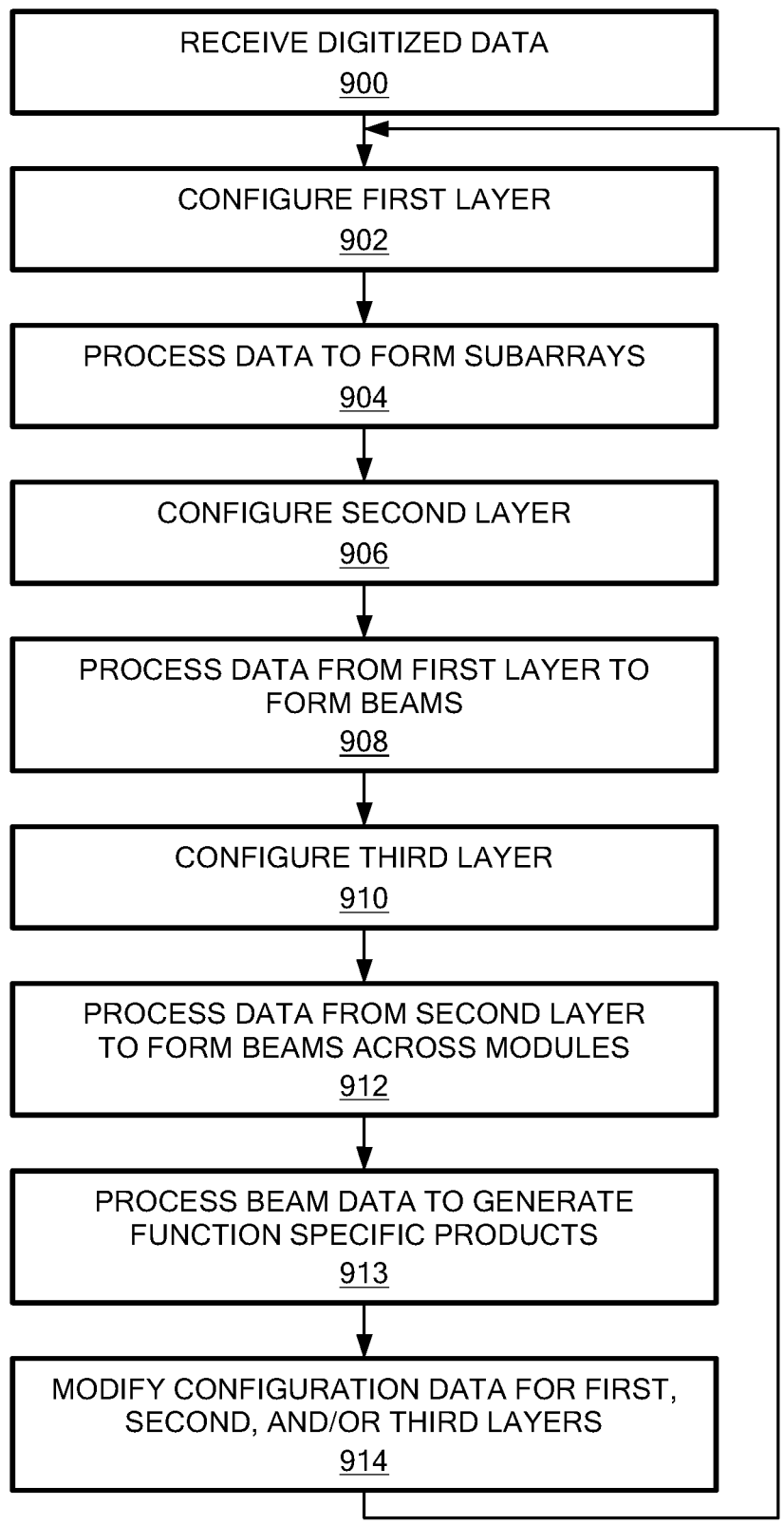
FIG. 9 shows an example sequence of steps for providing layered beamforming in accordance with example embodiments of the invention.

FIG. 9 shows an example sequence of steps for providing layered beamforming in accordance with example embodiments of the invention. In step 900, digitized data is received from antenna elements. In step 902, a first layer is configured for a selected operation, such as to form certain subarrays. In step 904, the data is processed in the first layer to generate the subarrays. In step 906, a second layer is configured for beamforming the subarrays for each module. In step 908, subarray data from the first layer is processed to output formed beams on a module basis. In step 910, a third layer is configured for beamforming across modules. In step 912, module beam data from the second layer is processed to form beams across the modules for aperture level beamforming. In step 913, beam data is processed by the function to generate the products it needs. In step 914, the configuration of the first, second, and/or third layers is modified in software with or without changes to firmware.

Figure 10:
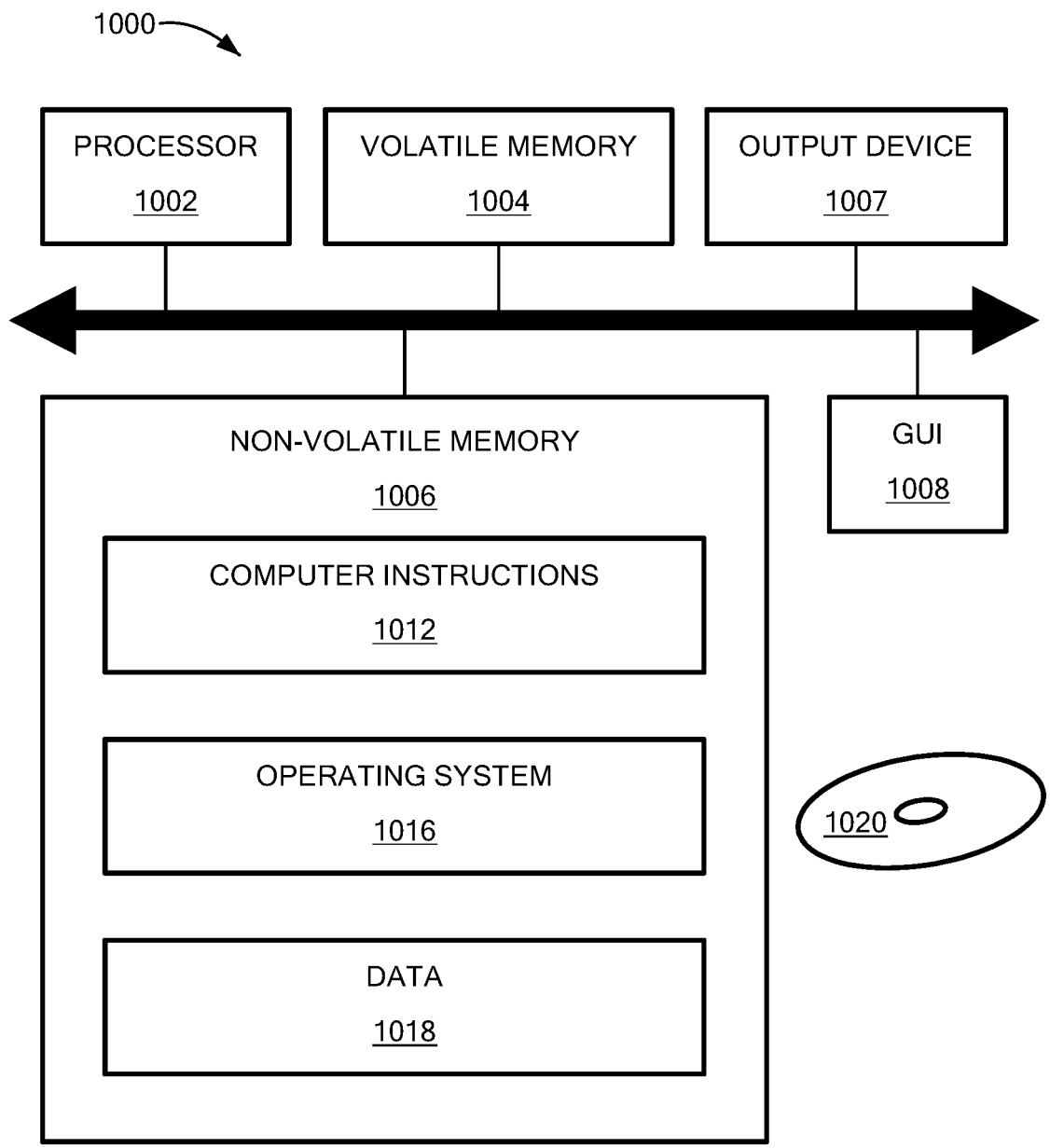
FIG. 10 shows an example computer that can perform at least a portion of the processing described herein.

FIG. 10 shows an exemplary computer 1000 that can perform at least part of the processing described herein. For example, the computer 1000 can perform processing to generate signals to configure circuit elements in the first, second, and/or third layers. The computer 1000 includes a processor 1002, a volatile memory 1004, a non-volatile memory 1006 (e.g., hard disk), an output device 1007 and a graphical user interface (GUI) 1008 (e.g., a mouse, a keyboard, a display, for example). The non-volatile memory 1006 stores computer instructions 1012, an operating system 1016 and data 1018. In one example, the computer instructions 1012 are executed by the processor 1002 out of volatile memory 1004. In one embodiment, an article 1020 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
  receiving, into a plurality of processing units, digitized array data from an array of antenna elements of an RF sensor system, the digitized array data comprising a plurality of data streams;
  in a first beamforming level, processing the array data to form subarrays and output subarray data for the formed subarrays;
  in a second beamforming level, processing the subarray data to form beams at a module level and output beamforming data for each of a plurality of modules; and
  in a third beamforming level, processing the beamforming data from each of the plurality of modules and combining the beamforming data from each of the plurality of modules to generate formed beams for aperture level beamforming outputs for the array;
  wherein, at least one of the first, second, and third beamforming levels comprises a software-controlled bit mask, the software-controlled bit mask defining, for the respective beamforming level, which data streams, of the plurality of data streams, should be combined as part of processing in the respective beamforming level and which data streams, of the plurality of data streams, to pass through the respective beamforming level.

2. The method according to claim 1, wherein the processing performed in the second beamforming level is independent of the first beamforming level.

3. The method according to claim 2, wherein processing by the first, second, and/or third beamforming levels is modified by software that is configured to determine a combination of elements to be processed during beamforming.

4. The method according to claim 2, wherein processing by the first, second, and/or third beamforming levels is modified by software and firmware is not modified.

5. The method according to claim 1, wherein the software-controlled bit-masks are controlled by software that is configured to determine a combination of elements to be processed during beamforming by changing the processing at the respective one or more beamforming levels that include the software-controlled bit mask.

6. The method according to claim 1, wherein each of the first, second, and third beamforming levels further comprises a processing unit and further including limiting each respective processing unit in the first, second, and third beamforming levels to a maximum number of elements.

7. The method according to claim 1, wherein the first beamforming level includes configurations for element-level processing, 2×2 element processing, 4×4 element processing, and column element processing.

8. The method according to claim 7, wherein the configurations for the first beamforming level are selected by the software-controlled bit mask.

9. The method according to claim 1, wherein the second beamforming level includes demultiplexers controlled by software to generate a selected beamforming configuration.

10. The method according to claim 1, wherein the third beamforming level is configured to pass through some of the beamforming data from the second beamforming level and to combine some of the beamforming data from the second beamforming level.

11. The method according to claim 10, wherein the third beamforming level includes selector elements controlled by software to perform the combining and the passing through of the beamforming data from the second beamforming level.

12. The method according to claim 1, wherein the beamforming data from the second beamforming level comprises outputs having multiple polarizations.

13. A system comprising:
a memory storing computer-executable instructions thereon;
a processor in operable communication with the memory, the processor configured for execution of the computer-executable instructions to provide:
a first beamforming level configured to process digitized array data from an array of antenna elements of a RF sensor system for forming subarrays and to output subarray data for the formed subarrays, the digitized array data comprising a plurality of data streams;
a second beamforming level configured to process the subarray data to form beams at a module level and output beamforming data for each of a plurality of modules; and
a third beamforming level configured to process the beamforming data from each of the plurality of modules and combining the beamforming data from each of the plurality of modules to generate formed beams for aperture level beamforming outputs to generate formed beams for aperture level beamforming outputs for the array
wherein, at least one of the first, second, and third beamforming levels comprises a software-controlled bit mask, the software-controlled bit mask defining, for the respective beamforming level, which data streams, of the plurality of data streams, should be combined as part of processing in the respective beamforming level, and which data streams, of the plurality of data streams, to pass through the respective beamforming level.

14. The system according to claim 13, wherein the processing performed in the second beamforming level is independent of the first beamforming level.

15. The system according to claim 14, wherein processing by the first, second, and/or third beamforming levels is modified by software that is configured to determine a combination of elements to be processed during beamforming.

16. The system according to claim 14, wherein processing by the first, second, and/or third beamforming levels is modified by software and firmware is not modified.

17. The system according to claim 13, wherein software-controlled bit-masks are controlled by software that is configured to determine a combination of elements to be processed during beamforming by changing the processing at the respective one or more beamforming levels that include the software-controlled bit mask.

18. The system according to claim 13, wherein each of the first, second, and third beamforming levels further comprises a processing unit, and wherein each respective processing unit in the first, second, and third beamforming levels is limited to a maximum number of elements.

19. The system according to claim 13, wherein the first beamforming level includes configurations for element-level processing, 2×2 element processing, 4×4 element processing, and column element processing.

20. The system according to claim 19, wherein the configurations for the first beamforming level are selected by the software-controlled bit mask.

* * * * *